Nov. 29, 1966 C. R. YOUNG 3,288,218
WELL TOOLS AND APPARATUS
Filed Oct. 3, 1963 6 Sheets-Sheet 1

INVENTOR
CARTER R. YOUNG
BY
ATTORNEYS

Nov. 29, 1966 C. R. YOUNG 3,288,218
WELL TOOLS AND APPARATUS

Filed Oct. 3, 1963 6 Sheets-Sheet 2

INVENTOR
CARTER R. YOUNG

BY

ATTORNEYS

INVENTOR
CARTER R. YOUNG

BY

ATTORNEYS

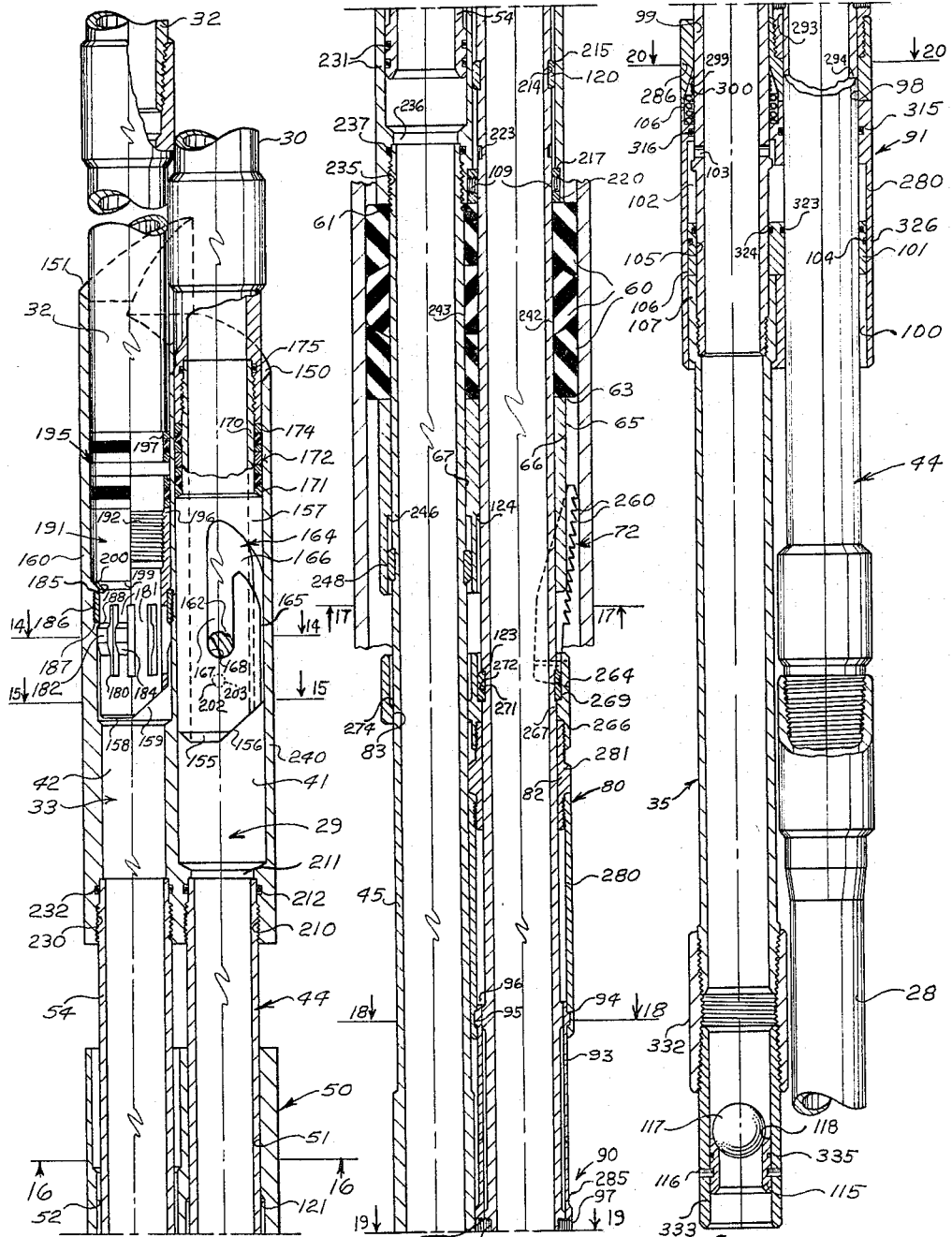

Nov. 29, 1966  C. R. YOUNG  3,288,218
WELL TOOLS AND APPARATUS

Filed Oct. 3, 1963  6 Sheets-Sheet 5

INVENTOR
CARTER R. YOUNG

BY

ATTORNEYS

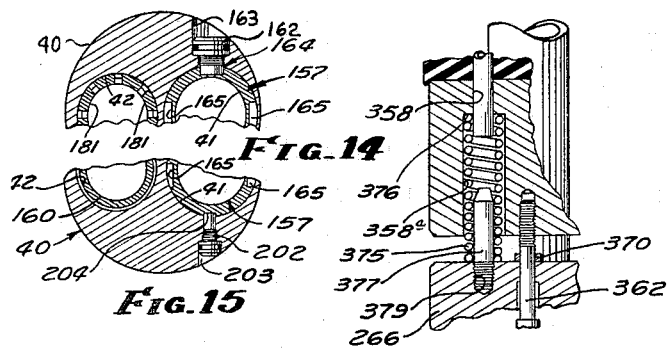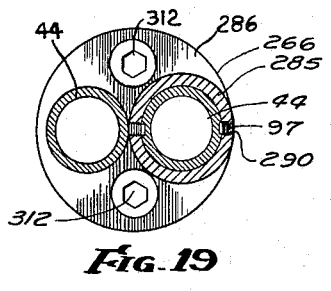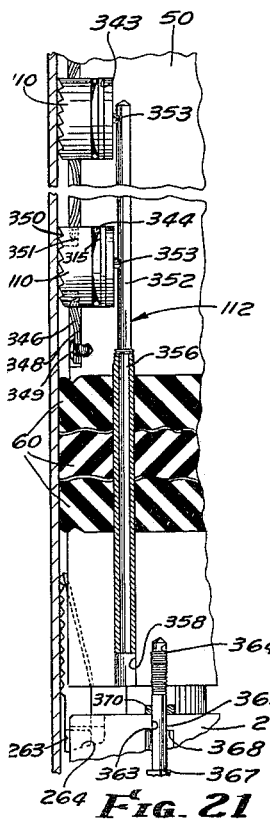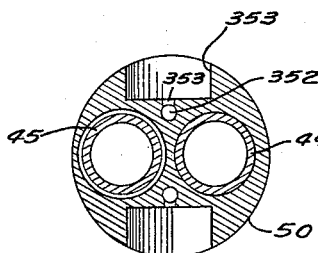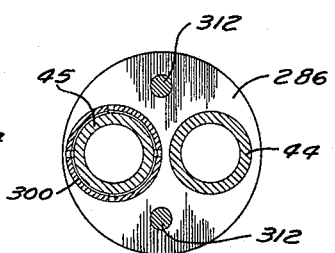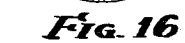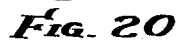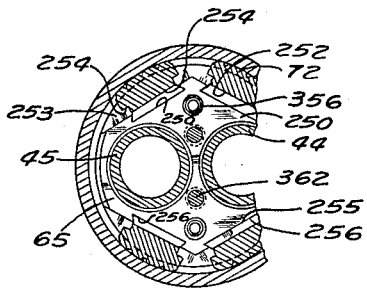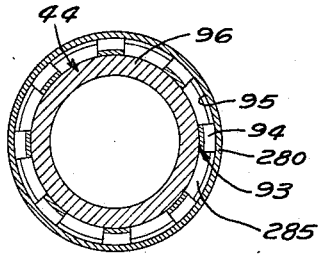

United States Patent Office 3,288,218
Patented Nov. 29, 1966

3,288,218
WELL TOOLS AND APPARATUS
Carter R. Young, Carrollton, Tex., assignor to Otis Engineering Corporation, Dallas, Tex., a corporation of Delaware
Filed Oct. 3, 1963, Ser. No. 313,563
17 Claims. (Cl. 166—119)

This invention relates to well tools and apparatus, and more particularly to well tools and apparatus for conducting well fluids from a plurality of separate producing zones of a well to the surface.

An object of the invention is to provide an apparatus for conducting well fluids from a plurality of producing formations or zones of a well to the surface which includes barrier or packer means in the well disposed between the producing zones and between the uppermost producing zones and the surface and separate flow passage means opening to the producing zones and extending to the surface for conducting well fluids from the producing zones to the surface without commingling.

Another object is to provide a well apparatus wherein the upper barrier or packer has means providing at least two passages therethrough in which are receivable flow conductors which extend to the surface therefrom and to which are connectable flow conductors which extend downwardly therefrom and communicate separately with separate producing zones.

Still another object is to provide a multiple flow conductor packer which is set without any manipulation of either of the flow conductors which extend therefrom to the surface.

A further object is to provide a multiple flow conductor having expandable anchoring and sealing means for anchoring the multiple packer in a well casing and for sealing between the well casing and the flow conductors wherein the anchoring and sealing means are set by fluid pressure introduced into one of the flow conductors without manipulation of either of the flow conductors which extend to the surface.

A still further object is to provide a packer having locking means for locking the anchoring and sealing means in their expanded positions.

A still further object is to provide a multiple flow conductor packer which is releasable from its anchored and sealing position in the well casing by means of a longitudinal upward non-rotational pull exerted on one of the flow conductors which extends to the surface.

Another object is to provide an apparatus for conducting well fluids from a plurality of spaced producing or earth formations or zones of a well separately to the surface which includes a lower packer or barrier between the producing zones and an upper packer or barrier above the producing zones, the well fluids from a lower producing zone flowing through a first flow passage provided by first flow conductor means which opens to the well below the lower packer and which extends through the two packers to the surface, the well fluids from an upper producing zone flowing through a second passage provided by a second flow conductor means which opens to the well between the two packers and which extends to the surface through the upper packer.

Another object is to provide a well apparatus wherein the upper well packer is lowerable into the well by means of the first flow conductor means and has anchoring and sealing means which are set by introducing fluid pressure into the second flow conductor means after the second flow conductor means has been connected to the packer and its passage closed by a pressure releasable valve means.

Still another object is to provide a multiple flow conductor packer having a head provided with a plurality of passages in whose upper ends the lower ends of flow conductors which extend to the surface are receivable, the head having dependent flow conductors connected thereto opening to the flow passages of the head and to separate producing zones of the well, and anchoring and sealing means for limiting downward movement of the packer in the casing of the well and for sealing between the dependent flow conductors and the casing which is set into expanded anchoring and sealing position by a hold-down body movable downward relative to the dependent flow conductors by fluid pressure introduced into one of the flow conductors which extends to the surface.

Still another object is to provide a multiple flow conductor packer wherein the hold-down body is provided with anchoring means engageable with the well casing for preventing upward movement of the hold-down body, the anchoring means being movable to expanded anchoring position by fluid pressure in the casing below the packer when the pressure differential across the anchoring and seal means of the packer which exert an upward force on the anchoring and sealing means exceeds a predetermined value.

A further object is to provide a new and improved well tool having a head provided with a plurality of passageways of different diameters and having guide means for selectively guiding flow conductors of different diameters into different selected passageways of the head.

A still further object is to provide a well tool wherein the guide means includes a first guide surface lying in a section of a conical plane which is concentric with a first passage of the head and a second guide surface lying in a section of a conical plane which is concentric with a second passage of the head which is of greater diameter than the first passage whereby a flow conductor of large diameter is directed by the guide surfaces to the passage of large diameter and a second flow conductor of small diameter subsequently lowered into the well is guided by the second guide surface to the flow passage of small diameter.

A still further object is to provide a well tool wherein the second guide surface extends completely about the second passage and partially about the first passage.

A still further object is to provide a well tool wherein the conical planes in which the two guide surfaces lie intersect along an arcuate line between the axes of the conical planes and wherein the apices of the conical planes are longitudinally spaced.

Additional objects and advantages of the invention will be readily apparent from the reading of the following description of a device constructed in accordance with the invention, and reference to the accompanying drawings thereof, wherein:

FIGURE 8 is a vertical partly sectional view showing the upper portions of the multiple flow conductor well packer with two flow conductors secured thereto and showing the elements of the packer in the positions assumed thereby when the well packer is in the anchored position and sealing position in a well;

FIGURE 9 is a view similar to FIGURE 8 being a continuation thereof and showing the intermediate portions of the well packer;

FIGURE 10 is a view similar to FIGURE 9 being a continuation thereof and showing the lower portions of the well packer;

FIGURE 14 is a fragmentary sectional view taken on line 14—14 of FIGURE 8;

FIGURE 15 is a fragmentary sectional view taken on line 15—15 of FIGURE 8;

FIGURE 16 is a sectional view taken on line 16—16 of FIGURE 8;

FIGURE 17 is a sectional view taken on line 17—17 of FIGURE 9;

FIGURE 18 is a sectional view taken on line 18—18 of FIGURE 9;

FIGURE 19 is a sectional view taken on line 19—19 of FIGURE 9;

FIGURE 20 is a sectional view taken on line 20—20 of FIGURE 10;

FIGURE 21 is a fragmentary vertical sectional view of the locking plungers for holding the locking body against upward movement in the well casing;

FIGURE 22 is a vertical sectional view showing a modified form of tthe means connecting the expander to the slip carrier;

Figure 23:
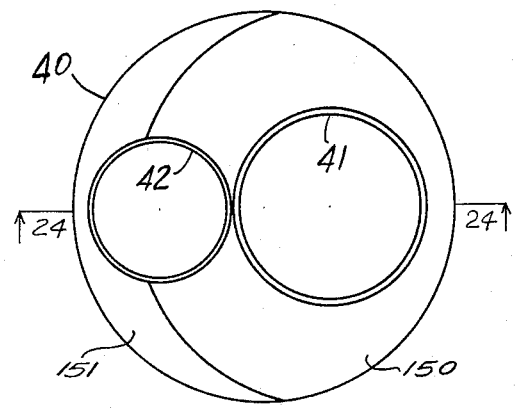
FIGURE 23 is a top view of the head of the multiple flow conductor well packer.
Figure 25:
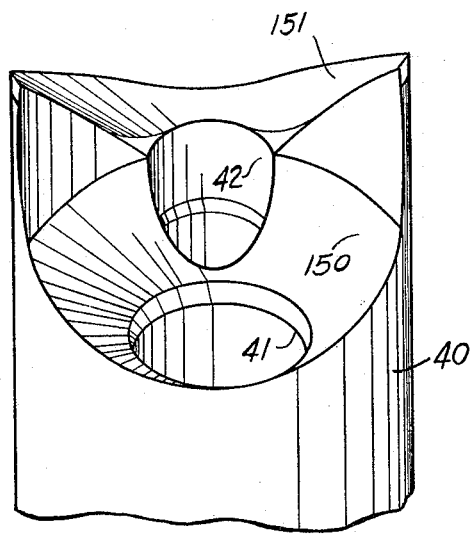
FIGURE 25 is an oblique view of the upper portion of the head.
Figure 24:
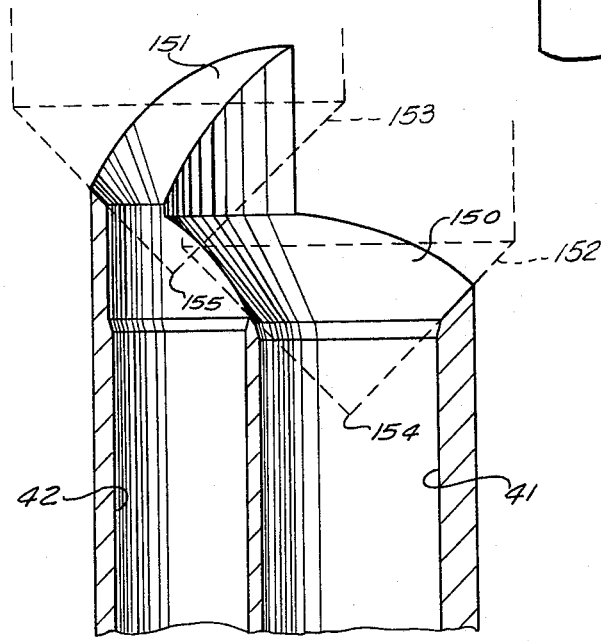
FIGURE 24 is a sectional view taken on line 24—24 of FIGURE 23.
Figure 1:
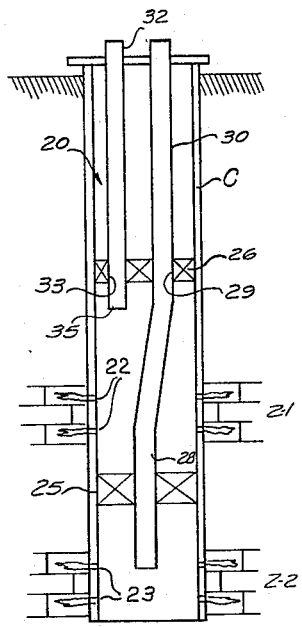
FIGURE 1 is a schematic vertical partly sectional view of the well apparatus embodying the invention in position in a well.

Referring now to FIGURE 1 of the drawings, the well apparatus 20 embodying the invention is shown installed in a well casing C provided with longitudinally spaced perforations 22 and 23 through which well fluids from the producing zones or earth formations Z1 and Z2 may flow into the casing. The lower barrier means or single flow conductor packer 25 is disposed between the producing zones in sealing relation with the casing and an upper barrier means or multiple flow conductor packer 26 is disposed in sealing relation with the well casing above the uppermost producing zone Z1. A long or lower flow conductor or tubing string 28 extends through the lower packer 26 and opens to the well casing therebelow. Its upper end is in communication with a suitable passage 29 of the multiple conductor packer 26 in which is received the lower end of the first flow conductor or string of tubing 30 which extends to the surface of the well so that well fluids from the lower zone are conducted through the tubing string 28 and the first flow conductor to the surface.

The lower end of the second flow conductor is received in the upper end of the second flow passage 33 of the multiple conductor packer and extends through the well head. A dependent extension or flow conductor 35 of the packer is in communication with the flow passage 33 and its lower end opens to the casing between the two packers so that well fluids from the upper producing Z1 may flow to the surface through the conductors 35 and 32.

The single conductor packer 25 may be of any suitable type and be lowered into the casing and set by means of suitable wire line tools in anchored and sealing relation with the well casing. The multiple conductor packer 26 to which the lower flow conductor 28 is secured is then lowered into the well by means of the first flow conductor 30 until the lower flow conductor moves into engagement with the packer 25. The second flow conductor 32 is then lowered into the well until its lower end is received in the passage 33 of the multiple conductor packer. The multiple conductor packer is then set to seal between the flow conductors and the casing after the mud in the casing between the two packers has been displaced or pumped out in the usual well known manner. The mud, of course, is left in the casing above the multiple conductor packer in order to maintain a downwardly acting pressure differential thereacross or to decrease any upwardly acting pressure differential thereacross. The fluids from the two zones flow separately without commingling to the surface through the flow conductors 30 and 32.

Figure 2:
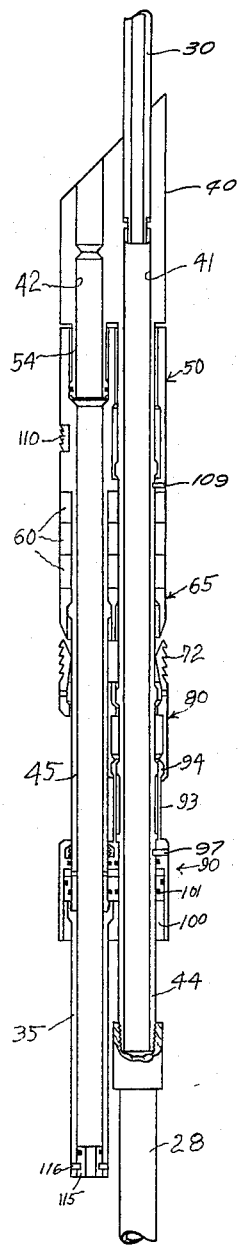
FIGURE 2 is a schematic vertical partly sectional view of the multiple flow conductor well packer embodying the invention showing its operative elements in the positions assumed thereby during the lowering of the well packer into the well casing of a well on a flow conductor.
Figure 3:
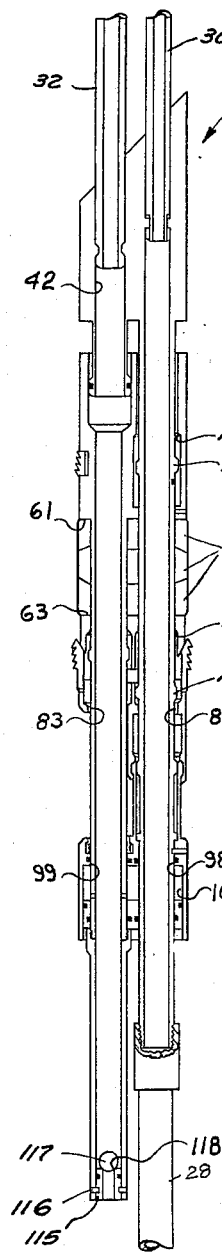
FIGURE 3 is a view similar to FIGURE 2 showing the well packer in anchored and sealing position in the well.
Figure 4:
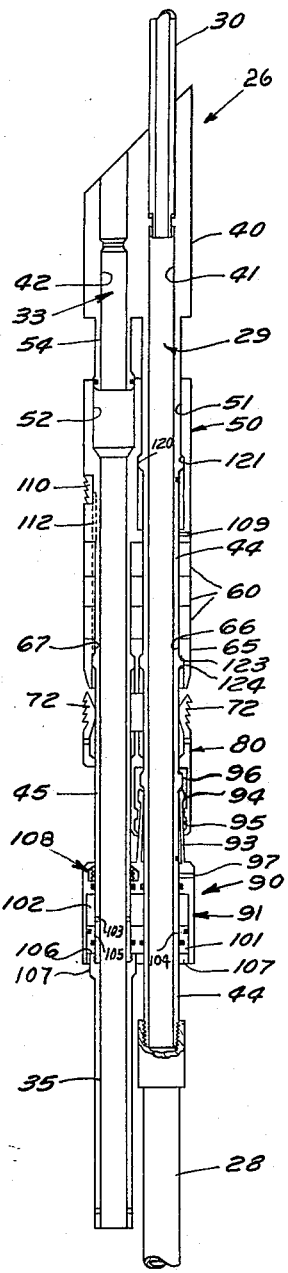
FIGURE 4 is a view similar to FIGURE 1 and shows the elements of the well packer in the positions assumed thereby during the removal of the well packer from the well.
Figure 5:
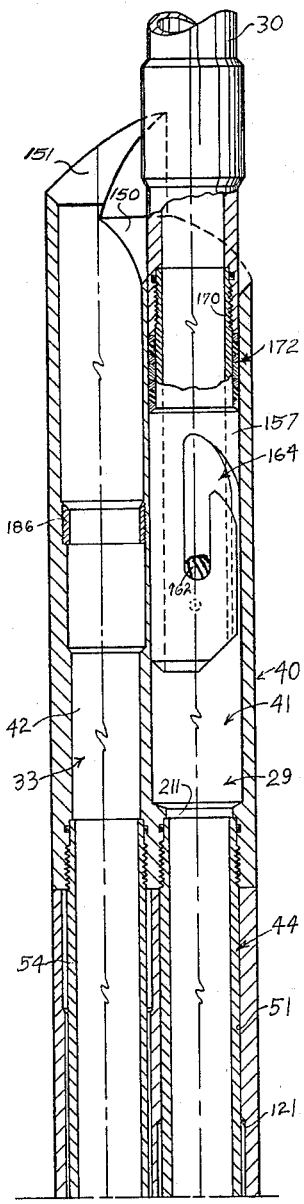
FIGURE 5 is a vertical partly sectional view of the upper portions of the multiple flow conductor well packer embodying the invention with its elements shown in the positions assumed thereby when the well packer is lowered into the well.
Figure 6:
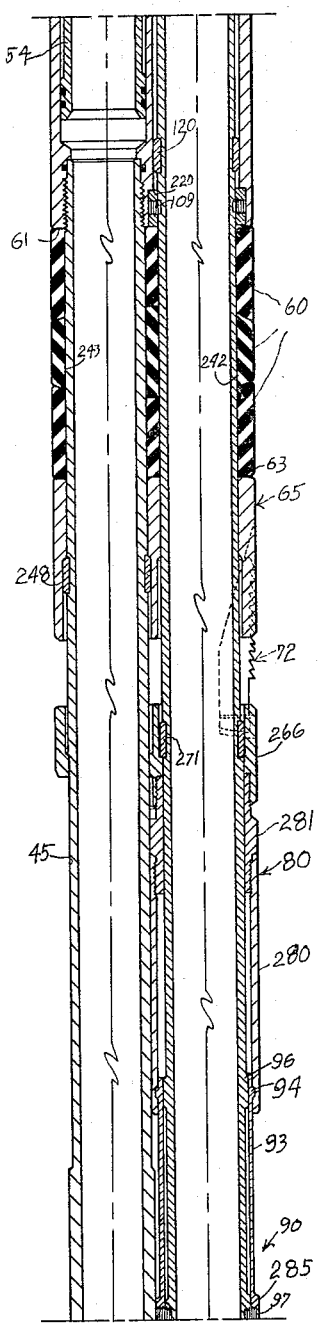
FIGURE 6 is a view similar to FIGURE 5 being a continuation thereof and showing the intermediate portions of the well packer.
Figure 7:
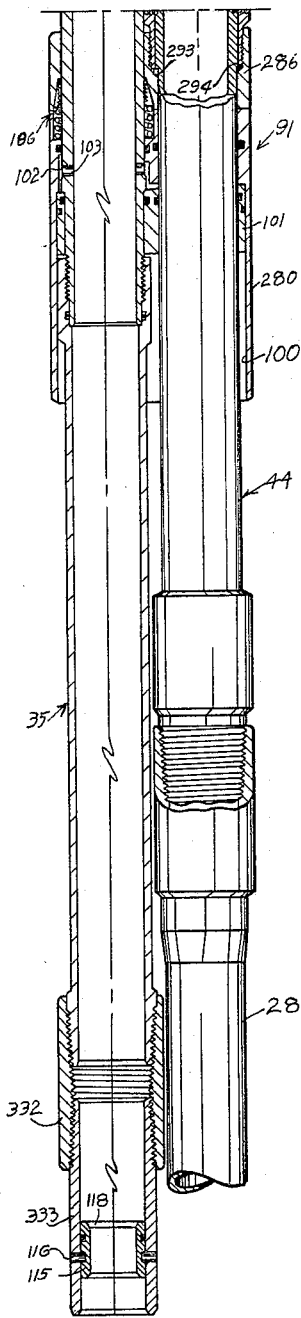
FIGURE 7 is a view similar to FIGURE 6 being a continuation thereof and showing the lower portions of the well packer in the positions assumed thereby when they are lowered into a well.
Figure 11:
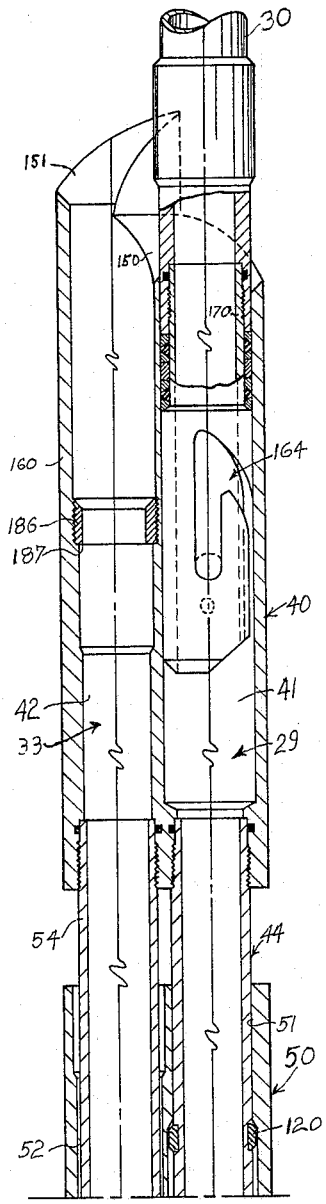
FIGURE 11 is a vertical partly sectional view of the well packer showing the elements thereof in the positions assumed thereby when the well packer is being removed upwardly from the wall.
Figure 12:
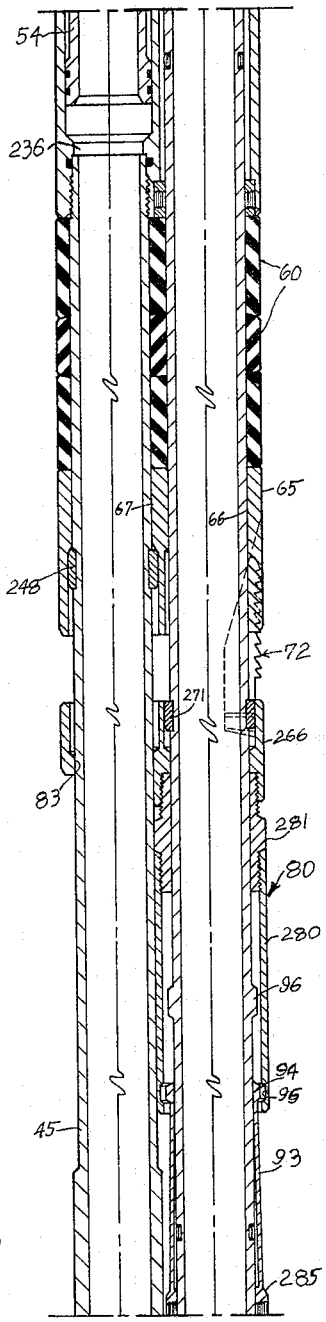
FIGURE 12 is a view similar to FIGURE 11 being a continuation thereof and showing the intermediate portions of the well packer.
Figure 13:
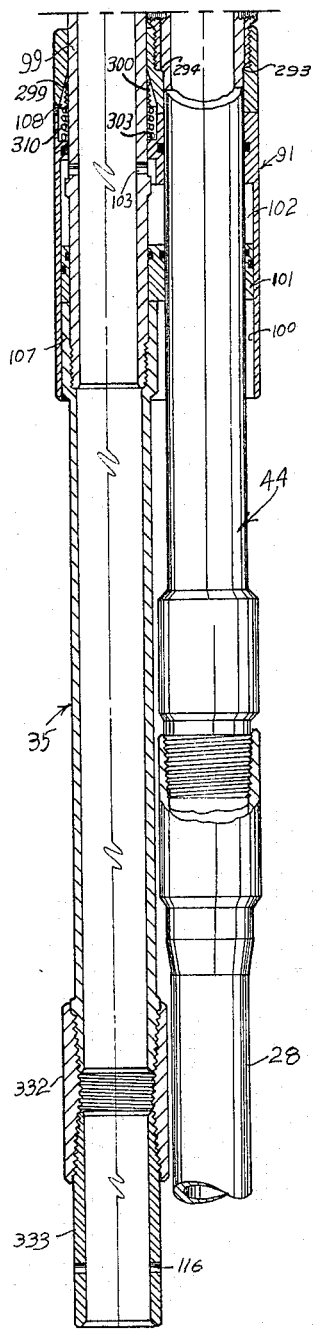
FIGURE 13 is a view similar to FIGURE 12 being a continuation thereof and showing the lower portions of the packer.

Referring now particularly to FIGURES 2, 3 and 4, the multiple flow conductor packer 26 includes a head 40 having a pair of passages 41 and 42, which constitute upper end portions of the passages 29 and 33, respectively, of the packer, a long mandrel 44 rigidly secured to the head in communication with the passage 41 and a short mandrel 45 movably secured to the head in commuciation with the second passage 42. The bores or longitudinal passages of the mandrels 44 and 45 constitute lower portions of the passages 29 and 33, respectively. The lower end of the first flow conductor 30 is receivable in the passage 41 and the lower end of second flow conductor 32 is receivable in the passage 42.

The packer includes a hold-down body 50 which comprises the short mandrel 45 and has a pair of parallel passages 51 and 52, the long mandrel extending through the passage 51 while the dependent tubular section 54 of the head 40 is telescoped in the upper end of the passage 52. A plurality of resilient packing elements 60 disposed about the mandrels are compressed and expanded laterally to seal between the mandrels and the well casing by downward movement of the hold-down body on the long mandrel. The packing elements are disposed between the downwardly facing shoulder or surface 61 of the hold-down body and the upwardly facing shoulder 63 of an expander 65 when downward movement of the expander on the long mandrel, which extends through the passage 66 of the expander, is arrested after the expander has moved a plurality of locking slips 72 outwardly to expanded positions wherein the locking slips engage the well casing. The short mandrel extends through the passage 67 of the expander.

The locking slips are mounted on a slip carrier 80 releasably held against downward movement on the mandrels 44 and 45, which extend through the parallel passages 82 and 83 thereof, respectively, by a latch or holding assembly 90. The latch assembly 90 includes a cylinder 91 provided with upwardly extending resilient collet fingers 93 whose external bosses 94 are held in the internal annular lock recess 95 of the slip carrier by an external annular lock flange 96 of the long mandrel. The cylinder is releasably secured to the long mandrel by a shear pin 97. The mandrels 44 and 45 extend through the parallel passages 98 and 99, respectively, of the cylinder to the downwardly opening bore 100 thereof. A piston 101 is disposed in the cylinder bore and with the cylinder defines a chamber 102 into which fluid pressure from the short mandrel is communicated by the lateral ports 103 thereof. The short and long mandrels extend through the parallel passages 104 and 105, respectively, of the piston. The piston is held against downward movement by its engagement with the top surface or stop shoulder 106 of the enlarged top end portion 107 of the dependent flow conductor 35 which is secured to the lower end of the short mandrel. The cylinder 91 has a latch assembly 108 engageable with the short mandrel which permits downward movement of the short mandrel relative to the cylinder but prevents its upward movement relative thereto.

The hold-down body 50 is releasably held in the upper position illustrated in FIGURE 2 by a shear pin 109 and is provided with locking plungers 110 which are movable outwardly to engage the well casing and hold the hold-down body against upward movement in the casing by fluid pressure from below the resilient packing elements communicated to the locked plungers by the passages 112 which extend through the hold-down body, the packing elements and the expander when the pressure below the expanded sealing packing elements exceeds the pressure thereabove by a predetermined value.

An annular ball seat 115 is releasably secured in the flow conductor 35, by means of a shear pin 116. The lower end of the lower flow conductor 35 may be closed by a ball 117 dropped into the second flow conductor 32, which engages the annular shoulder 118 of the ball seat.

In use, the single string packer 25 may be set in the casing C between the producing zones Z1 and Z2 and the multiple flow packer 26, with the long lower flow conductor 28 secured to the long mandrel 44 and the short lower flow conductor 35 secured to the short mandrel 45, and with all elements thereof in the positions illustrated in FIGURE 2, is then lowered into the well by means of the first flow conductor 30 whose lower end is disposed in the first passageway 41 of the head and releasably secured to the head. This assembly is lowered into the well until the lower flow conductor 28 engages the lower packer 25 and extends thereinto to open to the well casing below the lower packer. The second flow conductor 32 is then lowered into the well until its lower end telescopes into the second passage 42 of the head. The ball 117 is dropped into the second flow conductor and moves by gravity or may be pumped down into the short lower flow conductor 35 and seats upon the valve seat 115 thus closing the lower end of the short lower flow conductor. The fluid pressure in the short mandrel and the short flow conductor is then increased, as by pumping into the second flow conductor at the surface. Such increased fluid pressure is communicated to the chamber 102 between the cylinder and the piston through the lateral ports 103 of the short mandrel causing the piston 101 to exert a downward force on the short mandrel. Since upward movement of the cylinder is prevented by the shear screw 97, which is of greater strength than the shear screw 109 which secures the hold-down body to the long mandrel 44, the shear screw 109 shears as the pressure in the chamber is increased and the hold-down body 50 is released for downward movement relative to the head and to the long mandrel. The force exerted by the piston on the flange 107 of the short mandrel now causes the hold-down body to move downwardly relative to the head and the long mandrel. Downward movement of the hold-down body first causes the expander 65 to move the slips 72 outwardly until the teeth thereof engage the well casing C and further downward movement of the expander is arrested whereupon continued further downward movement of the hold-down body causes the resilient packer elements 60 to be compressed and expanded laterally outwardly into sealing engagement with the well casing thus closing the passage between the well casing and the long and short mandrels. When the packing elements 60 are in their expanded sealing position, the pressure in the well casing below the packing elements is communicated to the internal surfaces of the locking plungers 110 and and when such pressure is greater by a predetermined value than the pressure above the packing elements, the locking plungers are moved outwardly to cause their upwardly facing teeth to engage the well casing and hold the hold-down body against upward movement. It will be apparent that the greater the pressure below the packing elements, the greater the force with which the locking plungers are held in engagement with the well casing.

The fluid pressure in the second flow conductor 32 and the short mandrel is then increased until the shear pin 116 fails and the ball seat 115 and the ball 117 forced out of the bottom end of the mandrel thus opening the short string mandrel and the lower short flow conductor 35 to flow therethrough. The lock assembly 108 prevents downward movement of the cylinder on the short mandrel and therefore downward and inward movement of the slips 72 if the pressure in the short mandrel is now decreased.

The well tool apparatus 20 now functions in the usual manner to conduct the well fluids from zone Z2 to the surface through the flow conductor 28, the long mandrel 44 whose bore constitutes the lower portion of the passage 29 of the packer, the head whose passage 41 constitutes the upper portion of the passage 29, and the first flow conductor 30 and the well fluids from the producing zone Z1 to the surface through the flow conductor 35, the bore of the short mandrel which with the bore of the dependent extension 54 constitutes the lower portion of the passage 33 of the packer, the head passage 42 which constitutes the upper portion of the packer passage 33, and the second flow conductor 32.

When it is thereafter desired to remove the well packer 26 from the well casing, an upward pull is exerted on the first flow conductor 30 which causes the shear screw 97 to fail and permit upward movement of the head 40 and the long mandrel 44 relative to the latch assembly 90. The short mandrel 45 is held against upward movement by the lock assembly 108 which locks it to the cylinder and by the slips 72 which are now in engagement with the casing. Upward movement of the long mandrel therefore moves the lock flange 96 upwardly out of engagement with the collet fingers 93 which are thus freed to move resiliently inwardly out of the lock recess 94. Continued upward movement of the first flow conductor 30, of the head and the long mandrel then causes the external annular flange 120 of the long mandrel to engage the downwardly facing annular shoulder 121 of the hold-down body 50 so that as the head and mandrel continue to move upwardly the hold-down body is also moved upwardly relative to the expander and the resilient packing elements are freed to move to their retracted positions. As the upward movement of the head is continued, the external flange 123 of the long mandrel engages the shoulder 124 of the expander and moves it upwardly relative to the slips. Upward movement of the expander relative to the slips moves the slips inwardly and out of engagement with the well casing. When the packing elements 60 move out of sealing engagement with the well casing, the pressures thereacross are equalized and the lock plungers 110 are moved back to their retracted positions by suitable spring means which biases them inwardly. The assembly of the two flow conductors 30 and 32, the packer 26 and the lower flow conductors 28 and 35 may then be removed upwardly as a unit.

If desired, the second flow conductor 32 may be removed from the well by pulling it upwardly before the packer 26 is released from sealing and anchored engagement with the well casing. In this case the pressures across the packer are equalized as soon as the second flow conductor is moved out of sealing engagement in the passage 42 of the head.

It will now be seen that the apparatus 20 may be installed in a well by the introduction of fluid pressure through the flow conductor 32, after the ball 117 has been dropped therethrough, to cause the setting of the slips and the expansion of the packing elements into sealing engagement with the well casing and that thereafter any downwardly acting pressure differential across the packer merely forces the packing elements into further expanded position and the slips 72 into firmer anchoring or gripping relationship with the well casing while an upwardly acting pressure differential across the packer causes the locking plungers to hold the hold-down body against upward movement so that the well packer is anchored in the well casing against longitudinal movement therein in either direction.

It will further be seen that upward movement of the flow conductor 30 results progressively in the release of the long mandrel for upward movement relative to the cylinder 91, upward movement of the hold-down body to permit the packer elements to move to their retracted positions, and upward movement of the expander 70 relative to the slips 72 to cause the slips 72 to move inwardly to their retracted position.

Referring now particularly to FIGURES 5 through 25 of the drawings, the top surface of the head 40 of the packer 26 has a first guide surface 150 lying in a section of conical plane which is concentric with the central longitudinal axis of the large passage 41 of the head so that all portions of the guide surface slope inwardly toward the upper end of the large flow passage. The second guide surface 151 of the head lies in a section of a conical plane whose axis is concentric with the axis of the small flow passage 42 so that all portions of the second guide surface slope inwardly toward the upper end of the said flow passage. The longitudinal axes of the two conical planes 152 and 153, in which the guide surfaces 150 and 151 lie, extend parallel and in spaced relationship to one another and are in the diametric plane which passes through the central axes of the two flow passages 41 and 42. The apex 154 of the conical plane 152 is spaced below the apex 155 of the conical plane 153 so that the first guide surface 150 is disposed below the second guide surface 151 and all portions of the second guide surface slope inwardly toward the first guide surface. The guide surfaces are engaged by the downwardly facing beveled surfaces 155 and 156 of the J-latch mandrel 157 whose external diameter is of course larger than the diameter of the small flow passage 42 so that it cannot enter into the flow passage 42 and therefore is guided by the guide surfaces 151 and 150 into the upper end of the flow passage 41 as the flow conductor 30, of which the J-latch mandrel constitutes the lower end portion, is lowered in the well. The guide surface 151 is similarly engaged by the downwardly facing and beveled surfaces 158 and 159 of a collet latch mandrel 160 which constitutes the lower end portion of the second flow conductor 32. The second flow conductor is lowered into the well after the flow conductor 30 has been inserted into the passage 41 so that the collet latch mandrel, which is of course smaller in external diameter than the diameter of the flow passage 42, cannot enter into the flow passage 41 and is guided by the guide surface 151 into the upper end of the small flow passage 42.

The head 40 is provided with a pair of pins 162, which are threaded in diametrically opposite bores 163 of the head which open into the passage 41, whose inner ends extend into the flow passage 41 and are receivable in a pair of usual J-slots 164 of the J-latch mandrel. As the J-latch mandrel is inserted into the passage 41, the downwardly opening long portions 165 of the J-slots 164 receive the pins 162, and as the long portions of the slots move to positions wherein the pins are in their upper ends, the latch mandrel is rotated in a counter clockwise direction, FIGURE 8 as seen from above, to move the connecting portions 166 of the J-slots over the pins to position the upper ends of short portions 167 of the J-slots in alignment of the pins. The J-latch mandrel is then moved upwardly until the pins engage the surfaces 168 defining the lower ends of the short portions 167 of the J-slots and thus secure the J-latch mandrel and therefore the first flow conductor 30 against upward movement relative to the head.

The J-latch mandrel has a reduced upper end portion 170 which is threaded into the lower end of the flow conductor 30 and which provides an upwardly facing annular shoulder 171 which limits downward movement of a seal assembly 172 disposed on the reduced end portion. The seal assembly is held against upward displacement on the reduced end portion of the mandrel by the downwardly facing annular shoulder 174 of the first flow conductor 30. The seal assembly seals between the J-latch mandrel and the internal surfaces of the head defining the flow passage 41 of the head. An O-ring 175 is disposed in an internal recess of the lower end of the flow conductor to seal between the reduced portion of the J-latch mandrel and the flow conductor above the threaded connection thereof.

The collet latch mandrel 160 is provided adjacent its lower end with a plurality of longitudinal circumferentially spaces slots 180 which define a plurality of resilient collet strips 181. The collet strips have external bosses 182 whose bottom upwardly and outwardly inclined shoulders 184 are engageable with upwardly facing obstructions, such as the top annular shoulder 185 of a latch ring 186 to cam the collet strips inwardly to permit the collet mandrel to pass such obstructions. The top shoulders 188 of the bosses are inclined downwardly and outwardly and are engageable with the bottom annular shoulder 187 of the latch ring to releasably resist upward movement of the latch mandrel for the passage 42. Since the angle of inclination of the shoulders 188 is considerably smaller than that of the bottom boss shoulders, a much greater upward force must be exerted to cause the collet strips to be resiliently forced inwardly due to the camming action between the top shoulders 188 and the latch ring shoulder 187 to free the collet latch mandrel for upward movement from the passage 42 than is necessary to cause the collet strips to be forced inwardly to permit the collet latch mandrel to move downwardly past upwardly facing obstructions.

The collet latch mandrel has a top end portion 191 which is threaded upon the reduced lower end portion 192 of the second flow conductor 32. A seal assembly 195 disposed about the reduced end portion 192 seals between the second flow conductor and the internal surfaces of the head defining the second passage 42 thereof. The seal assembly 195 is held against downward movement on the reduced end portion by the annular top end shoulder 196 of the collet latch mandrel and against upward movement thereon by the annular downwardly facing shoulder 197 of the flow conductor. The external annular shoulder 199 of the collet latch mandrel is engageable with the upwardly facing annular shoulder 200 of the head to limit downward movement of the collet latch mandrel, and therefore the second flow conductor, of which the mandrel constitutes the bottom end portion, into the passage 42 of the head.

A shear pin 202 threaded in a suitable bore 203 of the head which projects into the flow passage 41 and into a suitable external bore 204 of the J-latch may be employed to prevent accidental undesired movement of the J-latch mandrel relative to the head and accidental separation or release therefrom. The shear pin will of course shear when a predetermined downward force is applied to the flow conductor and the flow conductor may then be released and removed from the head by downward movement until the top end portions of the short longitudinal portions 167 of the J-slots 164 are in alignment with the pins 162, and whereupon a clockwise rotation, FIGURE 8 as seen from above, of the J-latch mandrel moves the top ends of the downward open long portions 165 of the slots into alignment with the pins 162 thus frees the collet latch mandrel for upward movement from the passage 42 of the head.

It will now be apparent that both flow conductors 30 and 32 are releasably securable to the head but that the first flow conductor 30 can be released from the head only upon downward, then upward, then rotational and then upward movement of the first flow conductor due to the provision of the shear pins 202, and the pins 162 and the inverted J-slots 164. The second flow conductor 32 may be secured to and released from the head by longitudinal movement thereof relative to the head.

It will be seen that the head is provided with a pair of guide surfaces 150 and 151 which guide the lower end of the first flow conductor of a large diameter into the large diameter passage 41 and that subsequently guide surface 151 of the head guides the second flow conductor 32 into the second flow passage 42 thereof. It will thus be apparent that the two flow conductors are selectively positionable in and removable from the flow passages 41 and 42 of the head.

The upper end of the long mandrel 44 is threaded, as at 210, into the lower end of the flow passage 41 of the head below the internal annular flange 211 thereof and an O-ring 212 disposed in a suitable internal annular recess of the head seals between the head and the long mandrel. The stop flange 120 of the long mandrel may be in the form of a ring disposed in an external annular recess 214 of the long string mandrel whose annular top end shoulder 215 is engageable with the annular downwardly facing shoulder 121 of the hold-down body 50 to limit upward movement of the long mandrel relative to the hold-down body.

The lower end portion 217 of the passage 51 of the hold-down body is enlarged and receives a stop ring 220 releasably secured to the long mandrel by a plurality of shear screws 109. The shear screws are threaded in suitable bores of the stop ring 220 and their inner ends extend into a suitable external annular recess 223 of the long string mandrel. Downward movement of the hold-down body relative to the long mandrel is limited by the engagement of its internal annular shoulder 224 with the annular top end surface of the stop ring 220.

The downward extension 54 of the head, whose upper end is threaded in the lower end of the passage 42 of the head, as at 230, extends downwardly into the passage 52 of the hold-down body and its longitudinal bore or flow passage thus forms a continuation of the flow passage 42 of the head. An O-ring 232 disposed in an annular internal recess seals between the extension and the head.

The head extension 54 is provided with a pair of O-rings 231 disposed in suitable annular external recesses of the extension adjacent to its lower end which seal between the extension and the internal surfaces of the hold-down body 50 defining the passage 52.

The short mandrel 45 is threaded in the lower reduced end portion 235 of the passage 52 of the hold-down body below the interal annular flange 236 thereof. An O-ring 237 disposed in an internal annular recess of the hold-down body seals between the short mandrel and the body above the threaded connection thereof.

The long and short mandrels extend through aligned apertures 242 and 243, respectively, in the annular resilient packing elements 60, and through passages 66 and 67, respectively, of the slip expander 70. The slip expander is held against downward movement on the short mandrel by the engagement of the internal annular shoulder 246 thereof wtih the upwardly facing annular end shoulder or surface of a stop ring 248 disposed in an external annular recess 249 of the short mandrel.

The expander 70 has a plurality of longitudinal dove tailed recesses 250 which extend upwardly and outwardly and in which are slidable similarly upwardly and outwardly inclined inner tongue portions 252 of the slips 72. The camming engagement of the planar surfaces 253 of the expander with the shoulders 254 of the slips as well as the camming engagement of the inner surfaces 255 of the slips with the surfaces 256 defining the inner ends of the dove tailed grooves causes the slips to be moved outwardly upon downward movement of the expander relative to the slips. The slips are provided with downwardly facing teeth 260 which penetrate into the internal surfaces of the well casing to prevent downward movement of the slips when the slips are moved to their expanded positions. The lower end or handle portions 263 of the slips are received in slots 264 of similar configuration in the top section 266 of the slip carrier 80. The engagement of the T-shaped handle portions with the surfaces of the top slip carrier section defining the slots 264 thereof permits lateral movement of the slips but prevents their longitudinal movement relative to the slip carrier.

The top section 266 of the slip carrier is provided with the parallel passages 267 and 83 through which the long and short mandrels, respectively, extend. The passage 267 constitutes the top end portion of the passage 82 of the slip carrier. The passage 267 has an enlarged upper portion which provides an internal annular upwardly facing shoulder 269 which is engageable with the bottom annular end shoulder of a stop ring 271 rigidly secured to the long mandrel and whose inner portions are receivable in an external annular recess 272 of the long mandrel. The top portion of the passage 83 of the top section of the slip carrier is enlarged to provide an internal annular upwardly facing shoulder 274 which is engaged with the bottom end shoulder of the stop ring 248 of the short mandrel.

The slip carrier includes a bottom latch section 280 and an intermediate connector section 281. The upper end of the connector section is threaded in the lower end of the top slip carrier section 266 and the bottom latch section is threaded in the lower end of the connector section.

The slip carrier latch assembly 90 includes a tubular collet section 285 whose lower end is threaded in the upper end of the passage 98 of the top section 286 of the cylinder 91. The circumferentially spaced collet fingers 93 of the collet section extend upwardly between the external annular flange 96 of the long mandrel and the lower end portion of the latch section 280. Their external bosses 94 are held in the internal annular recess 95 in the bottom latch section 280 of the slip carrier when the cylinder is held in its upper position on the long mandrel by the shear screws 97 threaded in suitable bores 290 of the collet section 285 whose inner portions extend into a suitable external annular recess 291 of the long mandrel. Downward movement of the long mandrel relative to the cylinder 91 is limited by the engagement of its external downwardly facing annular shoulder 293 with the upwardly facing annular internal shoulder 294 of the top cylinder section 286 so that the shear screws are not subjected to any force tending to shear them when a downward force is applied to the long mandrel 44. The top cylinder section has annular beveled surface 299 which is engaged by the outer surfaces of the plurality of segments 300 of the locking assembly 108 whose internal downwardly facing teeth engage the outer surface of the short mandrel. The bottom cylinder section has an upwardly facing internal annular shoulder 303 against which bears the lower end of a spring 310 disposed about the short mandrel. The upper end of the spring bears against the lower ends of the segments 300 and thus biases them inwardly due to the camming engagement of the coengageable surfaces of the slips and of the top cylinder section.

The top cylinder section is secured to the bottom section in any suitable manner, as by the bolts 312 which extend downwardly through suitable bores of the top cylinder section into a suitable threaded upwardly opening bore in the upper end of the bottom cylinder section.

The bottom cylinder section has a pair of O-rings 315 and 316 disposed in suitable annular internal recesses thereof which seal between the bottom cylinder section and the long and short mandrels above the chamber 102.

The annular piston 101 has O-rings 323 and 324 disposed in suitable internal recesses thereof which seal between the piston and the long and short mandrels, respectively. An O-ring 326 disposed in a suitable external recess of the piston seals between the piston and bottom internal surfaces of the bottom cylinder section defining the downwardly opening enlarged recess 100 thereof.

The lower flow conductor 35 has a bottom section 333 connected to its top section 331 by a suitable coupling collar 332. The ball seat 115 is secured in the bottom section 333 by means of the shear pin 116 and an O-ring 335 disposed in an annular external recess of the ball seat 115 seals between the ball seat and the bottom mandrel section.

The locking plungers 110 disposed in suitable laterally outwardly opening bores 343 of the hold-down body 50 have O-rings 344 disposed in suitable annular recesses 345 thereof which seal between the hold-down body and the plungers. The plungers are biased inwardly toward retracted positions in the lateral bores by leaf spring assemblies 346 whose outer ends are disposed in suitable external longitudinal recesses 348 of the hold-down body. The outer edge portions of the spring assemblies are secured by screws 349 which extend through suitable apertures in the spring assemblies into the threaded bores of the hold-down body. The inner end portions of spring assemblies extend into suitable recesses 350 of the plungers and bear against the outer surfaces 351 to the plungers to bias them inwardly. The flow passages 112 each comprises a longitudinal passage 352 of the hold-down body, the ports 353 which extend between the bores 343 and the passage 352, a duct 356 whose upper end is threaded in the lower end of the passage 352 and which extends through suitable apertures in the packing elements, and a longitudinal bore 358 of the expander which opens downwardly and into which the duct extends to transmit fluid pressure to the bores 343 from below the expanded sealing elements 60 to bias the plungers outwardly and into engagement with internal surfaces of the well casing when the pressure from below the expanded packer elements exceeds the pressure thereabove by a predetermined value determined by the biasing force exerted on the plungers by the spring assemblies 346.

Downward movement of the top section 266 of the slip carrier relative to the expander 70 is limited by a plurality of bolts 362 which extend through suitable bores 363 of the slip carrier into the threaded bores 364 of the expander. The bolt heads 367 engage the annular downwardly facing shoulders 368 of the top slip carrier section 266 to limit such movement of the slips relative to the expander. If desired, a suitable spacer washer 370 may be disposed about each of the bolts 362 to limit upward movement of the slip carrier section relative to the expander.

The expander, if desired, may be biased upwardly from the top slip carrier section by biasing springs 375 disposed in enlarged lower portions 358a of the bores 358 which provide annular shoulders 376 against which the upper ends of the biasing springs bear. The lower ends of the springs bear against the top surface of the top slip carrier section. The lower portions of the springs telescope over spring retainers or guide pins 377 which extends upwardly into the enlarged portions 358a of the bores and whose lower ends are threaded in suitable upwardly opening bores 379 of the top slip carrier section.

It will be now be seen that the packer assembly 26 may be lowered in the well casing after a single string packer of any suitable type has been set in the well casing between the producing zones Z1 and Z2 thereof by securing the first flow conductor 30 to the head 40 by means of a J-latch mandrel 157 which is telescoped into the upper end of the passage 41 of the head, then rotated and subsequently moved upwardly to locate the pins 206 in the bottom ends of the short longitudinal sections 167 of the J-slots. The shear pins 202 may be inserted into the bores 205 to releasably secure the J-latch mandrel, and therefore the first flow conductor 30, against longitudinal movement in the passage 41. The long string of tubing or flow conductor 28 is of course secured to the lower end of the long string mandrel 44 as illustrated. This assembly of the packer 26, the first flow conductor 30 and the flow conductor 28 is then lowered into the well casing with all components of the assembly in the positions illustrated in FIGURES 5, 6 and 7 until the lower end of the tubing extends into and is sealingly engaged by the bottom packer or barrier 25 and is held suspended in the well casing by means of the flow conductor 30. The second flow conductor 32 with the collet latch mandrel 160 secured to its lower end is then lowered into the well casing and is moved downwardly thereto until it telescopes into the passage 42 of the packer head 240. The collet latch mandrel is guided by the engagement of its beveled shoulders 158 and 159 with the second guide surface 151 of the head into the top end of the passage 42. The collet bosses 182 move the collet strips resiliently inwardly to permit their movement pass the stop ring 186 whereupon the flow conductor 34 is releasably latched and secured in the flow passage 42 of the head.

The ball 117 is then introduced into the upper end of the second flow conductor 32 and is allowed to drop by gravity or is pumped downwardly in the second flow conductor through the passage 42 of the head, the head extension 54 and the short mandrel 45 into the flow conductor 35 and into engagement with the annular shoulder 118 of the ball seat 115. Fluid pressure introduced into the second flow conductor at the surface is communicated to the chamber 102 and exerts a downward force on the piston 101. The force exerted by such fluid pressure in the chamber 102 moves the short mandrel and the hold-down body downwardly causing the shear screws 109 to shear. Downward movement of the hold-down body causes the packing elements 60 and the expander 70 to move downwardly relative to the long mandrel and the slips 272 since the slip carrier 80 is now held against downward movement on the long string mandrel by the engagement of the bosses 94 of the collet fingers 93 of the collet latch assembly in the internal annular lock recess of the slip carrier 80. The resilient packer elements resist deformation and thus the expander 70 causes the slips 72 to be moved outwardly into gripping or anchoring engagement with the well casing wherein their downwardly facing teeth grippingly engaging the internal surfaces of the well casing. When outward movement of the slips is arrested downward movement of the expander is also arrested and continued movement of the hold-down body causes the packer elements to be compressed longitudinally and to expand radially outwardly into sealing engagement with the internal surfaces of the well casing to seal between the casing and the long and short mandrels 44 and 45. The short mandrel moves downwardly past the segments 300 of the latch assembly 106 since the downwardly facing teeth thereof permit such downward movement. Any upward movement of the short mandrel is immediately stopped by the gripping engagement of the downwardly facing teeth therewith since the cylinder 91 is now held against movement relative to the mandrels by the shear screws 97.

When the packing elements are in their fully expanded sealing position with the well casing a further increase in the pressure introduced into the second flow conductor causes the shear pins 116 to shear whereupon the valve seat and the valve 117 drop out of the lower end of the lower flow conductor 35 thus the opening of the lower end thereof.

It will be apparent that after the multiple flow conductor packer is set either one of the flow conductors 30 or 32 or both of these flow conductors may be removed from the well without necessitating the removal of the packer 26 and can subsequently be again connected to the packer 26. For example, an upward pull exerted on the second flow conductor will cause the collet strips 181 of the collet latch mandrel 160 to be cammed inwardly by the engagement of the boss shoulders 188 of the bosses with the bottom end shoulder 187 of the stop ring 186 to release the collet latch mandrel from the head. The first flow conductor may also be removed by merely moving it downwardly to shear the pins 202 and to position the pins 206 in the upper ends of the short portions 167 of the J-slots 164, then rotating the first flow string in a clockwise manner, FIGURE 8, and then lifting it upwardly as the downwardly opening long portions 165 of the J-slots move into alignment with the pins 206 thus freeing the J-latch mandrel for upward movement from the flow passage 41 of the head. Similarly, both flow conductors may then again be lowered and secured releasably to the packer head. In the event both flow conductors have been removed, it is of course necessary to replace the first flow conductor 30 in the well and in engagement with the head before the second flow conductor is again lowered into the well and into engagement with the head of the packer 26. The engagement of the beveled shoulders of the latch mandrels with the guide surfaces 151 and 152 guide the J-latch mandrel past the upper end of the flow passage 42 and into the passage 41. Subsequently the second flow conductor may be positioned in the flow passage 42 being guided thereinto by the guide surface 151.

If it is desired to remove the assembly 20 from the well casing, the second flow conductor is preferably removed from the well and then an upward pull is imparted to the flow conductor 30 to cause shearing of the shear screws 97. When the shear screws 97 fail, the long mandrel is movable upwardly with the head 40 relative to the cylinder 91 and the collet fingers 93 so that its external lock flange 96 moves out of engagement with the internal surfaces of the collet fingers which then are freed to move resiliently inwardly out of the lock recess 95 of the slip carrier. Continued upward movement of the long mandrel and the head now causes the external top shoulder 215 of the lock ring 120 to engage the downwardly facing annular shoulder 121 of the hold-down body and move it upwardly thus permitting the packing elements to move resiliently out of the sealing engagement with the well casing. Subsequently the engagement of the top shoulder of the stop ring 123 with a downwardly facing annular shoulder 124 of the expander moves the expander upwardly relative to the slips which may still be in gripping engagement with the internal surfaces of the well casing. Such upward movement of the expander relative to the slips causes the slips to be moved inwardly, due to the tongue and groove connection of the slips with the expander, and out of engagement with the well casing until the slips move back to their fully retracted position whereupon engagement of the heads of the bolts 362 with the shoulders 368 causes the slip carrier to be moved upwardly with the expander. The cylinder remains locked to the short mandrel and moves upwardly therewith when the top shoulder 215 of the stop ring 120 engages the shoulder 121 of the hold-down body. The hold-down body of course telescopes upwardly on the head extension 54 during such upward movement, the extension having been in an uppermost position in the passage 52 of the hold-down body when the packer was in its set position.

When the packer elements are in their expanded sealing positions, the pressure from immediately below the sealing elements which exerts an upward force on the packer and tends to move it upwardly is communicated through the passages 112 to the inner ends of the bores 343 and to the internal surfaces of the plungers 110 and, in the event that such pressure exceeds the pressure above the packing elements by a predetermined value, the plungers are moved outwardly against the biasing force of the spring assemblies to cause their upwardly facing teeth to engage and grip the internal surfaces of the well casing and thus lock the hold-down body against upward movement in the well casing. Any such upwardly acting pressure differential of course tends to move the expander upwardly further compressing the packing elements and into better sealing engagement with the well flow conductor. Regardless of the direction of the pressure differential across the packing elements the packer and the packing elements are held in position by either the slips or the lock plungers and the sealing elements or compressed and biased towards their expanded sealing positions by such pressure differentials.

It will now be seen that a new and improved well tool assembly has been illustrated and described which includes a packer having a head provided with two or more passages into which are telescopable and releasably securable the lower ends of the flow conductors which extend to the surface therefrom, and that a lower flow conductor 28 secured to the head and in fluid communication with one of the passages means the long mandrel 44 extends to a single lower packer between two producing zones while the other passage of the head communicates between the lower and upper packers thus permitting production of well fluids from two separate vertically spaced producing zones to the flow conductors which extend to the surface commingling.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well apparatus including: a well casing passing through upper and lower producing zones in a well bore, said casing having upper and lower openings through which well fluids from said upper and lower zones can flow into the well casing; a first barrier means in said casing between said upper and lower openings: a second barrier means in said casing above said upper openings, said second barrier means including a head, said head having a pair of longitudinal passages therethrough, said head having means in said passages for releasably securing first and second flow conductors to said head which extend to the surface of the well, said first and second flow conductors being removable upwardly from said second barrier means when released from said head, said second barrier means being movable into the well casing by means of one of said flow conductors; a pair of tubular means connected to said head and communicating with said passages for conducting fluids from said lower and upper zones into said first and second conductors, one of said tubular means extending to said first barrier means and communicating at its lower end with said well casing below said first barrier means, said head having a first guide surface inclined inwardly to one of said passages and a second guide surface inclined from said first guide surface to the other of said passages, said first guide surface being also inclined inwardly toward the other of said passages, said first and second guide surfaces guiding said first flow conductor into said other of said passages and said first guide surface subsequently guiding said second flow conductor into said one of said passages, said other of said passages being of greater diameter than said one of said passages.

2. The well apparatus of claim 1 wherein said guide surfaces lie in sections of conical planes having central axes concentric with the longitudinal axes of said passages.

3. The well apparatus of claim 2 wherein the apex of the conical plane in which said second guide surface lies is spaced below the apex of the conical plane in which said first guide surface lies.

4. The well apparatus of claim 3, wherein said longitudinal axes of said passages are spaced and extend parallel to one another and are disposed in a diametric plane of said head.

5. The well apparatus of claim 1, wherein said second barrier means includes seal means for sealing between the well casing and said tubular means of said head; anchoring means mounted on said tubular means; and hold-down means mounted on said tubular means for longitudinal movement relative to said tubular means for moving said anchoring means into anchoring engagement with the well casing and the seal means into sealing engagement with said well casing and said tubular means.

6. The well apparatus of claim 5, said second barrier means including means operated by fluid pressure introduced into one of said flow conductors for moving said hold-down means relative to said anchoring and sealing means to expand the sealing and anchoring means into engagement with said well casing.

7. The well apparatus of claim 6, wherein said anchoring means includes a plurality of slips and a slip carrier mounted on one of said tubular means, latch means releasably holding said slip carrier against movement on said one of said tubular means, and expander means movable by said hold-down body for moving said slips between expanded and retracted positions upon movement of said expander in one longitudinal direction relative to said one of said tubular means.

8. The well apparatus of claim 7, wherein said latch means release said one of said tubular means for movement relative to said slip carrier to move said expander means in a direction opposite said one direction after said slips have been moved into engagement with the well casing by an upward pull imparted to said one of said flow conductors.

9. The well apparatus of claim 8, and lock means on said hold-down body movable into expanded position and engagement with said well casing to prevent upward movement of said hold-down body in the well casing when a pressure differential across said second barrier means exerts an upward force of predetermined value on said packer.

10. The well apparatus of claim 9, wherein said upper barrier means has passage means for communicating pressure from below said second barrier means to said lock means to bias said lock means outwardly toward expanded position.

11. A well packer including: a head having a pair of longitudinal passages therethrough, said head having a means in said passages for securing flow conductors to said head which extend into upper ends of said passages; a pair of mandrels secured to said head and communicating with the lower ends of said passages, anchoring means mounted on said mandrels and including slips movable laterally between retracted and expanded positions, expander means engageable with said slips movably mounted on said mandrels for moving said slips between said retracted and expanded positions upon longitudinal movement of said expander means relative to said slips; a hold-down body releasably secured to one of said mandrels; seal means disposed about said mandrels and between said expander means and said hold-down body, said hold-down body upon movement in one longitudinal direction relative to said one of said mandrels moving said expander means and said seal means in said one direction to move said slips to their expanded positions and to expand said seal means into expanded sealing position; and pressure responsive means mounted on said mandrels for moving said hold-down means in said one longitudinal direction when the pressure in the other of said mandrels is increased to a predetermined value, said pressure responsive means including latch means engageable with said mandrels for preventing movement of said other of said mandrel in said other longitudinal direction relative to said one of said mandrels.

12. The well packer of claim 11, said hold-down body having lock means movable into expanded positions to engage a well casing and prevent upward movement of said hold-down body, said packer having passage means opening to the extension of the packer at one longitudinal end of said seal means to communicate fluid pressure therefrom to said lock means to bias the lock means toward expanded position.

13. The well packer of claim 11, said told-down body having lock means movable into expanded positions to engage a well casing and prevent upward movement of said hold-down body, said packer having passage means opening to the extension of the packer at one longitudinal end of said seal means to communicate fluid pressure therefrom to said lock means to bias the lock means toward expanded position.

14. A well packer including: a body having a pair of longitudinal passages of different diameters and guide surfaces on its upper end for selectively guiding flow conductors of different diameters into the passages; a long mandrel rigidly secured to said body and in communication with one of said passages, said head having a dependent tubular extension communicating with the other of said passages; a hold-down body having a pair of passages, said long mandrel extending through one of said passages in said hold-down body and said dependent tubular extension of said head extending into the other of said passages of said hold-down body; means releasably securing said hold-down body in an upper position on said long mandrel, said hold-down body having a short mandrel extending downwardly therefrom and in communication with said other passage of said head; an expander mounted on said mandrels below said hold-down body; seal means disposed about said mandrels between said expander and said hold-down body; a plurality of slips operatively associated with said expander and movable laterally outwardly by said expander into expanded position upon downward movement of said expander on said long mandrel and movable to retracted positions upon upward movement of said expander relative thereto; a slip carrier engageable with said slips for holding said slips against longitudinal movement relative to said long mandrel; latch means mounted on said long mandrel engageable with said slip carrier for holding said slip carrier against longitudinal movement on said long mandrel; pressure operated means for moving said hold-down body and said expander downwardly relative to said long mandrel to move said slips outwardly into expanded positions and to expand said seal means mounted on said mandrels, said pressure operated means being movable downwardly by fluid pressure introduced into one of said passages of said head.

15. The well packer of claim 14, wherein pressure operated means comprises a cylinder releasably secured to said long mandrel against upward movement relative thereto and providing a chamber; a piston disposed in said chamber, said short mandrel having port means communicating with said chamber, said piston moving said short mandrel and said hold-down body downwardly when said piston is moved downwardly relative to said long mandrel by fluid pressure introduced into said short mandrel; and latch means engageable with said short mandrel and said cylinder for preventing upward movement of said short mandrel relative to said cylinder.

16. A well tool including: a head having a pair of longitudinal passages therethrough, said head having means in said passages for releasably securing first and second flow conductors to said head in fluid communication with said passages, said head having a first guide surface inclined inwardly to one of said passages and a second guide surface inclined from said first guide surface to the other of said passages, said passages being of different diameters, said first and second guide surfaces guiding a flow conductor of large diameter into said other of said passages and said first guide surface subsequently guiding a second flow conductor of small diameter into said one of said passages, said guide surfaces lying in sections of conical planes having central axes concentric with the longitudinal axes of said passages, the apex of the conical plane in which said second guide surface lies being spaced below the apex of the conical plane in which said first guide surface lies.

17. The well tool of claim 16 wherein said longitudinal axes of said passages extend parallel to one another and are disposed in a diametric plane of said head.

References Cited by the Examiner

UNITED STATES PATENTS

| | | | |
|---|---|---|---|
| 3,098,524 | 7/1963 | Brown | 166—119 |
| 3,136,569 | 6/1964 | Bigelow | 166—125 |
| 3,189,095 | 6/1965 | De Rochemont | 166—134 |

CHARLES E. O'CONNELL, *Primary Examiner.*

JACOB L. NACKENOFF, *Examiner.*

J. A. LEPPINK, *Assistant Examiner.*